US009753656B2

United States Patent
Li et al.

(10) Patent No.: US 9,753,656 B2
(45) Date of Patent: Sep. 5, 2017

(54) DATA SYNCHRONIZATION METHOD, APPARATUS AND SYSTEM

(71) Applicant: Tencent Technology (Shenzhen) Co., Ltd., Shenzhen, Guangdong (CN)

(72) Inventors: Zhongwei Li, Guangdong (CN); Xiaohui Zhou, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 136 days.

(21) Appl. No.: 14/752,434

(22) Filed: Jun. 26, 2015

(65) Prior Publication Data

US 2015/0293712 A1    Oct. 15, 2015

Related U.S. Application Data

(63) Continuation of application No. PCT/CN2013/089624, filed on Dec. 17, 2013.

(30) Foreign Application Priority Data

Dec. 28, 2012  (CN) .......................... 2012 1 0580436

(51) Int. Cl.
*G06F 12/00*   (2006.01)
*G06F 3/06*    (2006.01)
*G06F 17/30*   (2006.01)

(52) U.S. Cl.
CPC ............ *G06F 3/0614* (2013.01); *G06F 3/065* (2013.01); *G06F 3/0646* (2013.01);
(Continued)

(58) Field of Classification Search
CPC .... G06F 3/0614; G06F 3/0646; G06F 3/0647; G06F 3/065; G06F 3/0683; G06F 17/30
See application file for complete search history.

(56) References Cited

U.S. PATENT DOCUMENTS

2002/0120637 A1*  8/2002  Parham ............ G06F 17/30584

FOREIGN PATENT DOCUMENTS

CN        1756108 A     4/2006
CN      101106477 A     1/2008
(Continued)

OTHER PUBLICATIONS

International Search Report dated Mar. 27, 2014 for corresponding International Application No. PCT/CN2013/089624, 7 pages.

*Primary Examiner* — Shawn X Gu
(74) *Attorney, Agent, or Firm* — Brinks, Gilson & Lione

(57) ABSTRACT

The disclosure provides a data synchronization system, apparatus and method. A primary memory area is created at a destination end apparatus, and an incremental synchronization process is performed. A source end apparatus records a log for a write operation, including operation information and a sequence number for the operation. A latest destination-end write operation sequence number is recorded. The source end pushes in real-time write operation information corresponding to a source-end write operation sequence number greater than the latest destination-end sequence number to the destination end if a latest source-end write operation sequence number is greater than the latest destination-end sequence number. The destination end apparatus performs a write operation on the primary memory area according to the write operation information, records a write operation sequence number of the primary memory area and sends a latest write operation sequence number of the primary memory area to the source end apparatus.

13 Claims, 7 Drawing Sheets

(52) U.S. Cl.
CPC .......... *G06F 3/0647* (2013.01); *G06F 3/0683* (2013.01); *G06F 17/30* (2013.01)

(56) References Cited

FOREIGN PATENT DOCUMENTS

| CN | 102098342 A | 6/2011 |
| CN | 102821111 A | 12/2012 |

\* cited by examiner

DATA SYNCHRONIZATION METHOD, APPARATUS AND SYSTEM

CROSS-REFERENCE TO RELATED APPLICATION

The application is a continuous application of international Application PCT/CN2013/089624, entitled "DATA SYNCHRONIZING METHOD, APPARATUS AND SYSTEM", and filed on Dec. 17, 2013, which claims priority to Chinese Patent Application No. 201210580436.3, entitled "DATA SYNCHRONIZATION METHOD AND SYSTEM" filed on Dec. 28, 2012, with the Chinese Patent Office, both of which are incorporated herein by reference in their entirety.

TECHNICAL FIELD

This disclosure relates to the field of computers and Internet data processing technologies, and in particular, to a data synchronization method, apparatus and system.

BACKGROUND

Internet services belong to services involving massive requests, and when Internet services are provided, some basic data always needs to be acquired by various types of services. At present, basic data is usually stored in a basic data query server, and service servers acquire the basic data from the basic data query server in a query manner of using a User Datagram Protocol (UDP) packet. There are two aspects of defects for this manner: in one aspect, the number of query requests that are sent to the basic data query server for querying basic data is huge, and therefore it is a processing bottleneck for the basic data query server to process the query requests; and in another aspect, the query manner of using a UDP packet occupies service processing time, and timeout of processing of query requests by the basic data query server causes timeout of service processing, which increases coupling of service processing to external services, and reduces controllability of service processing.

To solve the defects of the two aspects, at present, a technical solution of agent query are usually used to acquire this type of basic data. The technical solution of agent query mainly includes that: An agent for basic data is installed on each service server, the Agent acquires periodically update of basic data at a basic data entry end (the entry end is also referred to as a data-writing end where the basic data is stored, such as a primary site of Internet services), and stores the acquired basic data at the service server locally, and when the service server needs to query the basic data, a local application programming interface (API) is called to query the basic data. In this technical solution of agent query, a huge quantity of read requests for the basic data query server from the service server are eliminated, and instead, synchronization operation of a small quantity of write requests at an entry end are required, which solves the problem of bottleneck of massive query requests read requests) for the basic data query server. And meanwhile, the service server acquires basic data by locally calling an API, and performance of a local interface is very high, which almost does not occupy service processing time, thereby reducing impacts on the service processing efficiency.

For a data synchronization mechanism between the agent on the service processor and the basic data entry end which is shortly referred to as a data entry end in this specification), timing synchronization is commonly used at present, that is, an Agent (destination end) may pull data from a source end (data-writing end) periodically to achieve synchronization of data. For example, crontab command may be performed periodically to pull data. Data may be pulled for example, through the File Transfer Protocol (FTP), the Hypertext transfer protocol (HTTP), or the like.

However, the foregoing periodic synchronization has poor real-time performance. If the duration for the synchronization is shortened to increase real-time performance, a huge quantity of synchronized data is synchronized again in each synchronization process, causing waste of the network bandwidth.

SUMMARY

Some embodiments of the disclosure provide a data synchronization method. At first, a primary memory area is created at a destination end. Then an incremental synchronization process is performed as follows. A source end records a log for a write operation, and the log includes operation information and a sequence number for the write operation. A latest destination-end write operation sequence number is recorded. The source end pushes in real-time write operation information corresponding to a source-end write operation sequence number greater than the latest destination-end write operation sequence number to the destination end if it is determined that a latest source end write operation sequence number is greater than the latest destination-end write operation sequence number. The destination end performs a write operation on the primary memory area according to the write operation information after receiving the write operation information. The destination end records a write operation sequence number of the destination-end primary memory area. The destination end sends a latest write operation sequence number of the destination-end primary memory area to the source end.

Some embodiments of the disclosure provide a source end apparatus of data synchronization. The source end apparatus includes an operation log module and a source-end synchronization module. The operation log module is configured to record a log for a write operation of the source end. The log includes operation information and a sequence number for the write operation. The source-end synchronization module is configured to record a latest destination-end write operation sequence number, and push in real-time write operation information corresponding to a source-end write operation sequence number greater than the latest destination-end write operation sequence number to the destination end if it is determined that a latest source-end write operation sequence number is greater than the latest destination-end write operation sequence number.

Some embodiments of the disclosure provide a destination end apparatus of data synchronization. The destination end apparatus includes a memory area creating module and a destination-end synchronization module. The memory area creating module is configured to create a primary memory area at the destination end. The destination-end synchronization module is configured to receive write operation information pushed by a source-end synchronization module, perform a write operation on the primary memory area according to the write operation information so as to update data in the primary memory area record a write operation sequence number of the destination-end primary memory area, and send a latest write operation sequence number of the destination-end primary memory area to the source-end synchronization module.

BRIEF DESCRIPTION OF THE DRAWINGS

The accompanying drawings are merely some examples the present disclosure, and the present disclosure is not limited to features shown in the figures. In the accompanying drawings, like elements are denoted by like reference numerals.

DETAILED DESCRIPTION

Figure 1:
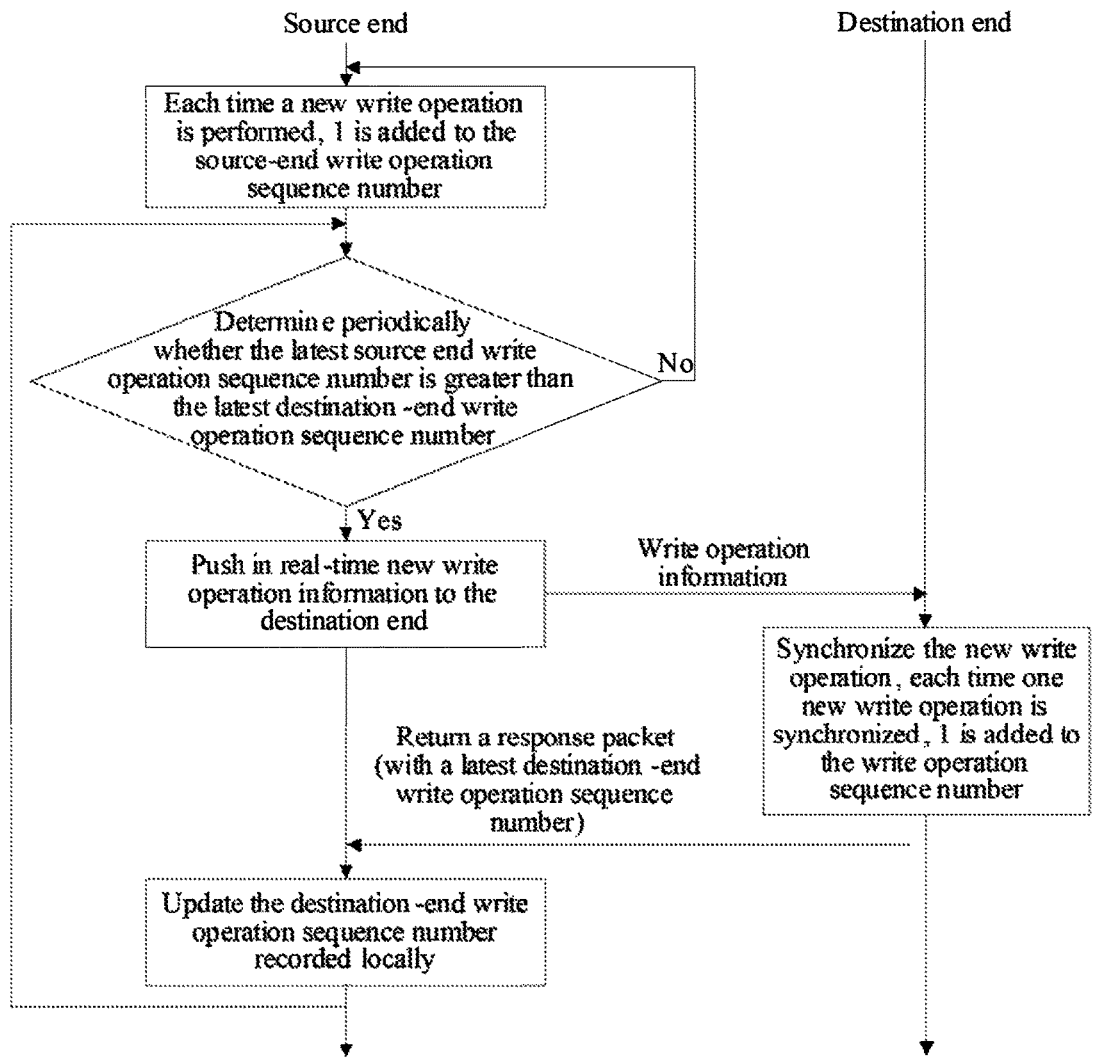
FIG. 1 is as flowchart of incremental data synchronization in a real-trine synchronization manner according to an embodiment of the present disclosure.

For simplicity, the solutions of the present disclosure are described below by several representative embodiments. Details in the embodiments are merely used to help understanding the solutions of the present disclosure. However, obviously, implementation of the technical solutions of the present disclosure may not be limited to those details. To avoid blurring the solutions of the present disclosure unnecessarily, some implementations are not described in detail, only frameworks are given. In the following descriptions, "including" refers to "including but not limited to", and "according to . . . " refers to "at least according to . . . , but not limited to only according to . . . " In addition, the articles "a" and "an" as used in this application and the appended claims may generally be construed to mean "one or more" unless specified otherwise or clear from context to be directed to a singular form.

According to the present disclosure, a source-end write operation sequence number and a destination-end write operation sequence number is recorded at a source end, another destination-end write operation sequence number is recorded at the destination end. A latest destination-end write operation sequence number is sent from the destination end to the source end. The source end updates the destination-end write operation sequence number recorded therein with the sequence number receive from the destination end, performs an incremental write operation according to the difference between the source-end write operation sequence number and the latest destination-end write operation sequence number, and synchronizes in real-time the incremental write operation to the destination end. As a result, real-time incremental data synchronization is achieved, and real-time performance of data synchronization is improved. Besides, because only incremental data is synchronized each time, occupation of network bandwidth is also reduced.

A data synchronization method and system of the present disclosure may be applicable to any scenario of data synchronization between a source end and a destination end. For example, in the technical solution of querying Internet basic data by using Agent, Agent for basic data is installed on each service server, and the service server with the Agent is a destination end of the present disclosure. The Agent may synchronize basic data update at a basic data entry end (the entry end is also referred to as a data-writing end where the basic data is stored, such as a primary site of Internet services), and the basic data entry end is a source end of the present disclosure. The Agent stores acquired basic data at the service server locally, and when the service server needs to query the basic data, an API is called to query the basic data.

The source end and the destination end are both intelligent terminals having data processing abilities, and include, but are not limited to, computers, workstations, servers, even some smartphones, Personal Digital Assistants, tablet computers, and smart televisions (Smart TV) that have excellent properties, and the like. An operating system is installed on these smart terminals, and includes, but is not limited to: Windows operating system, LINUX operating system, Android operating system. Symbian operating system, Windows mobile operating system, iOS operating system, or the like.

Some specific types and specific operating systems for the smart terminal are listed above in detail, but it may be realized by a person skilled in the art that the implementation of the present disclosure is not limited to these, and may also be applied to any other smart terminal and operating system.

The source end of the present disclosure may correspond to more than two destination ends. For example, in the technical solution of querying Internet basic data by using Agent, there may be multiple service servers, and therefore there would be two or more destination ends. According to the present disclosure, data synchronization may be performed between the source end and two or more destination ends.

According to the present disclosure, a primary memory area is first created at the destination end. The primary memory area is the memory space generated by dividing access addresses of the memory of the destination end. Incremental synchronization data at the destination end is written into the primary memory area. The method of the present disclosure further includes an incremental synchronization process. FIG. 1 is a flowchart of incremental data synchronization by using a real-time synchronization manner according to the present disclosure.

Referring to FIG. 1, according to the incremental synchronization process, at first, the source end records a write operation log. The log includes operation information and a sequence number for the write operation. The operation information includes, for example, data about operations such as adding, editing, deleting, or the like. Each time a new write operation is performed, 1 is added to the source-end write operation sequence number. Meanwhile, the source end also records a destination-end write operation sequence number and keeps it to be the latest by updating operation.

The source end may determine periodically whether the latest source end write operation sequence number is greater than the latest destination-end write operation sequence number. If it is determined that the latest source end write operation sequence number is greater than the latest destination end write operation sequence number, the source end pushes in real-time write operation information corresponding to the source-end write operation sequence number(s) greater than the latest destination-end write operation sequence number, to the destination end. After receiving the write operation information, the destination end performs a corresponding write operation on the primary memory area according to the write operation information so as to update data in the primary memory area, records and updates a write operation sequence number of the destination-end primary memory area, and returns the latest write operation sequence number of the destination-end primary memory area to the source end. The source end updates, with the sequence number returned by the destination end, the destination-end write operation sequence number stored in the source end.

The write operation information is pushed in real-time by the source end to the destination end. The destination end may record and update the write operation sequence number of the primary memory area upon finishing a write operation. For example, each time one write operation is synchronized, 1 is added to the write operation sequence number of the primary memory area. According to some embodiments, in addition to the write operation information, the sequence number corresponding to the operation information is pushed in real-time by the source end to the destination end. The destination end may update the write operation sequence number of the primary memory area according to the sequence number received from the source end. For example, if receiving write operation information and a corresponding sequence number of n, the destination end performs the write operation, and updates the write operation sequence number of the primary memory area as n.

According to the present disclosure, the source end may inform the destination end data change caused by a new write operation to achieve data synchronization in real-time. The source end and the destination end may perform the same write operation, so that consistency of data between the two ends is ensured in real-time.

In addition, packet loss or data abnormity happens possibly in network transmission. And hence there may be difference between data of the two ends for the real-time data synchronization disclosed with reference to the embodiment of FIG. 1. That is to say, the accuracy of data synchronization is poor. Therefore, according to an embodiment of the present invention, a standby memory area may be created at the destination end, and a full update process is further added.

Figure 2:
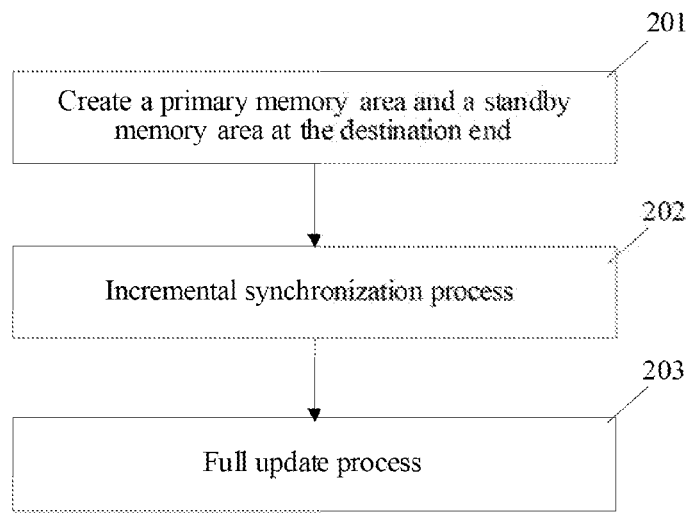
FIG. 2 is a flowchart of an embodiment of the present disclosure that includes both an incremental synchronization process and a full update process.

FIG. 2 is a flowchart of an embodiment that includes both an incremental synchronization process and as full update process according to the present disclosure.

As shown in FIG. 2, at first, at 201, a primary memory area and a standby memory area are created at the destination end.

The primary memory area and the standby memory area are both shared memory space of the destination end, and are generated by dividing access addresses of physical memory. The shared memory space may be accessed by various processes, and service processes may always access the primary memory area.

Then, at 202, an incremental synchronization process is performed. At first, the source end records at write operation log, and the log includes operation information and a sequence number for the write operation. Meanwhile, the source end also records as destination-end write operation sequence number and keeps it to be the latest by updating operation. Then the source end pushes in real-time, write operation information corresponding to the source-end write operation sequence number(s) greater than the latest destination-end write operation sequence number, to the destination end, if the source end determines that the latest source-end write operation sequence number is greater than the latest destination-end write operation sequence number. After receiving the write operation information, the destination end performs a corresponding write operation on the local primary memory area according to the write operation information so as to update data in the primary memory area, updates a write operation sequence number of the destination-end primary memory area, and sends the latest write operation sequence number of the destination-end primary memory area to the source end. The incremental synchronization process ensures real-time performance of data synchronization between the destination end and the source end.

Next, at 203, a full update process is performed. The source end may periodically import full data of its memory and the current source-end write operation sequence number (i.e. the source-end write operation sequence number at the importing moment) into a specified storage device, for example, a specified database. The destination end may periodically pull the full data and the source-end write operation sequence number from the specified storage device, and store them into the destination-end standby memory area. Then the standby memory area is taken as a primary memory area to perform the incremental synchronization process, and the previous primary memory area is taken as a standby memory area. The full update process can anther improve accuracy of data synchronization meanwhile ensuring real-time performance of service data processing at the destination end.

In the embodiment shown in FIG. 2, a primary and standby double memory mechanism is used in the destination end, incremental synchronization processing is performed to update data in the primary memory area to achieve real-time data synchronization, and periodic full update processing is performed to update data in the standby memory area so as to keep full consistency of data between the destination-end standby memory area and the source-end memory. Thus, even data error occurs in the incremental synchronization process, the error may be corrected through the full update. Therefore accuracy of data synchronization is improved. The standby memory area and the primary memory area of the destination end is interchanged after the full update, so that real-time performance and accuracy of service data processing at the destination end is ensured.

Further, in an embodiment, in the full update process, after pulling and storing the full data and the source-end write operation sequence number, the standby memory area is changed as a primary memory area to perform the incremental synchronization process, and meanwhile the previous primary memory area is changed as a standby memory area. However, there may be a delay problem. After the standby memory area is changed as the primary memory area, the source-end write operation sequence number at the importing moment (that is, the latest destination-end write operation sequence number) needs to be returned to the source end, and the source end needs to synchronize with the destination end all write operations corresponding to the sequence number(s) between the latest source-end write operation sequence number and the source-end write operation sequence number at the importing moment. Some write operations may have been synchronized before the primary memory area is changed as the standby memory area. As a result, a processing delay is caused, which is going against real-time processing of a service process.

Therefore, according to another embodiment of the present invention, the full update process further includes steps 231 to 233 to be described below, which are performed after the destination end pulls and stores the full data and the source-end write operation sequence number at the importing moment.

At 231, the destination end sends an active incremental synchronization request to the source end, and the request includes the source-end write operation sequence number at the importing moment.

At 232, after receiving the active incremental synchronization request from the destination end, the source end returns write operation information corresponding to the source-end write operation sequence number(s) greater than the source-end write operation sequence number at the importing moment as a response to the destination end that initiates the request.

At 233, after receiving the response from the source end, the destination end performs a corresponding write operation on the standby memory area according to the write operation information in the response to update the data in the standby memory area, and records a write operation sequence number of the destination-end standby memory area. If the latest write operation sequence number of the standby memory area is greater than or equal to the latest write operation sequence number of the primary memory area, the standby memory area is changed as a primary memory area to perform the incremental synchronization process and accordingly the previous primary memory area is changed as a standby memory area.

After the foregoing steps 231 to 233, before changing memory area, data in the standby memory area has been updated in real-time to be synchronous to data of the source end. Therefore, after changing memory area, write operations between the latest source-end write operation sequence number and the source-end write operation sequence number at the importing moment can be eliminated, which saves time, further improves real-time performance of data synchronization, and is advantageous to real-time processing of to service process.

Figure 3:
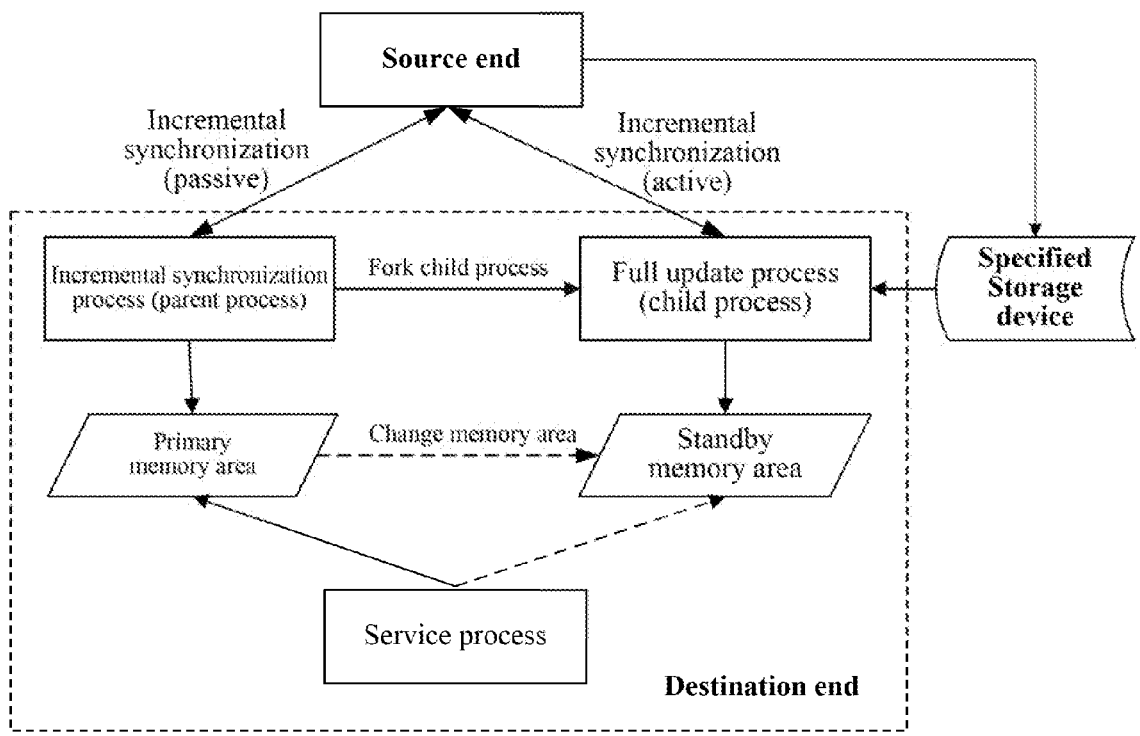
FIG. 3 is a schematic diagram of a destination end performing incremental synchronization and full update by using double processes.

In addition, in order that the incremental synchronization of current data is not stopped during performing the full update, the incremental synchronization process may be performed by the destination end through a parent process, and the full update process may be performed by the destination end through a child process. FIG. 3 is a schematic diagram of the destination end performing incremental synchronization and full update with double processes. Referring to FIG. 3, the incremental synchronization process (i.e. parent process) performs incremental synchronization operation, and generates, through fork operation, a child process, that is, a full update process. The full update process performs full data update operation, and the parent process, that is, the incremental synchronization process, ensures incremental synchronization of newly-added data.

According to the above embodiment of the invention, soft switching between the primary memory area and the standby memory area is performed to correct error of destination-end data, and thus accuracy of destination-end data is ensured.

Figure 4:
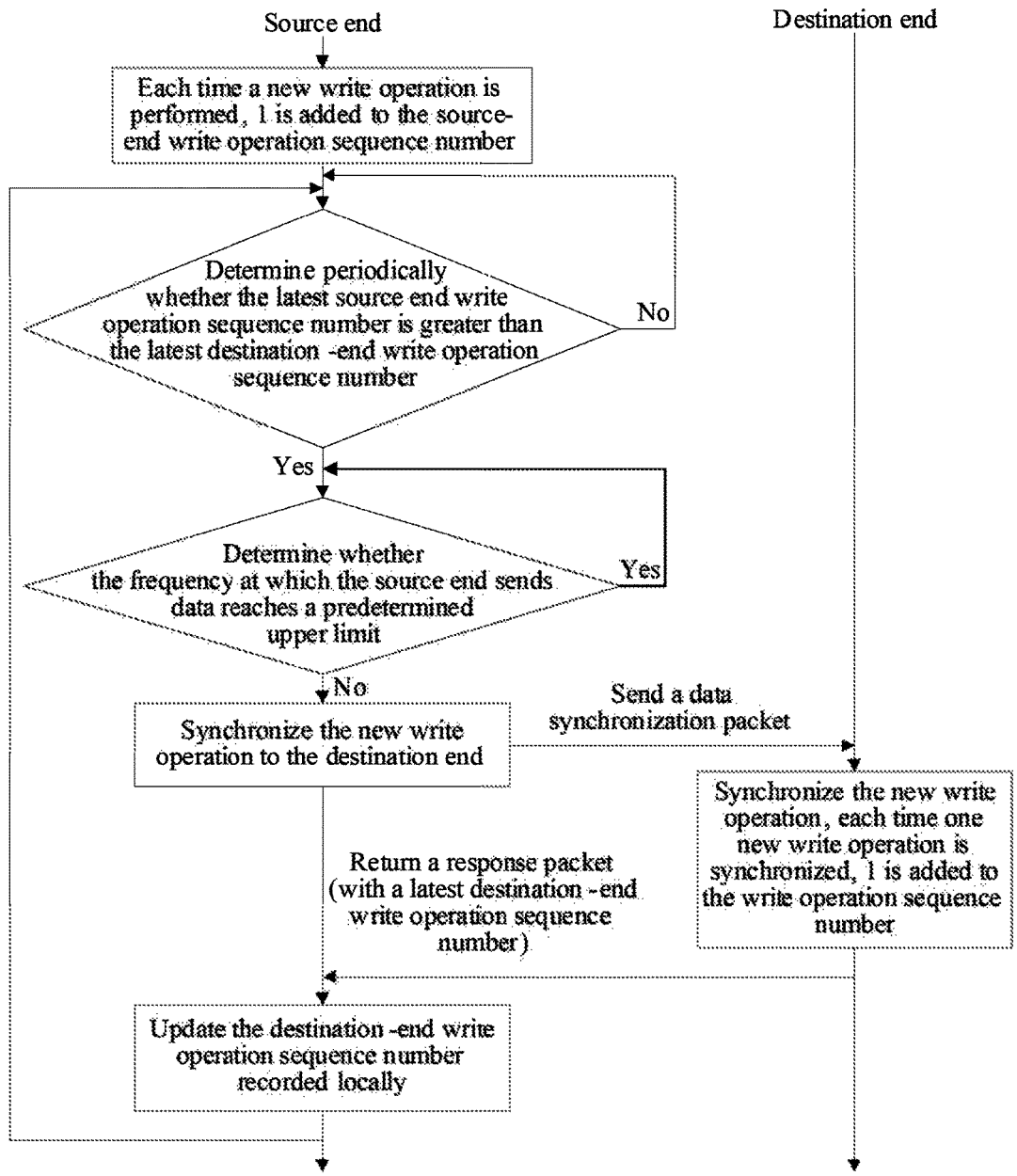
FIG. 4 is a flowchart of an incremental synchronization process according to an embodiment of the present disclosure.

FIG. 4 is a flowchart of an incremental synchronization process according to an embodiment of the present disclosure. Referring to FIG. 4, each time one new write operation is performed, the source end may record operation information of the write operation in a log and update a sequence number in the log by, for example, adding a value of 1 to the sequence number. An initial value of a destination-end write operation sequence number stored at the source end may be a value of 0. Each time a write operation sequence number q is received from the destination end, the source end updates the destination end write operation sequence number stored therein with the sequence number q.

In order to push in time the write operation information to the destination end, the source end needs to update the destination-end write operation sequence number in time, check and determine in time the difference between destination end write operation sequence numbers for all destination ends (there may be two or more destination ends) and the latest source-end write operation sequence number. And the source end may push to a corresponding destination end in time all write operation information corresponding to sequence number(s) less than the latest source-end write operation sequence number but greater than the destination-end write operation sequence number. In order to achieve the objective of being in time, the source end needs to check each destination-end write operation sequence number periodically, and determine whether the latest source-end write operation sequence number is greater than the destination-end write operation sequence number, so as to monitor in time update of data and push the latest operation information to the destination end.

In addition, because checking and determining are performed periodically, multiple write operations may occur at the source end for each period. Therefore, if the latest source-end write operation sequence number is greater than the latest destination-end write operation sequence number, all write operation information (including sequence numbers of the write operations) corresponding to the source-end write operation sequence number greater than the latest destination-end write operation sequence number is packaged into a data packet, i.e., as data synchronization packet shown in the figure. And the data synchronization packet is pushed in real time to the destination end. The destination end then sequentially performs write operations (i.e., incremental synchronization write operations) according to the sequence number(s) corresponding to the write operation information in the data synchronization packet. Each time one write operation is synchronized, 1 is added to the write operation sequence number of the primary memory area. After all write operations have been synchronized, the source end is notified of the latest write operation sequence number q of synchronized primary memory area in a form of a response packet. After receiving the latest destination-end write operation sequence number, the source end updates, with the sequence number q, the destination-end write operation sequence number stored therein.

In addition, the number of the destination ends may be relatively large. For example, when Agent is used to performing basic data synchronization, each service server with Agent is a destination end. The source end may send, in a short period, a great amount of write operation information used for updating data to each destination end, and it may possibly cause a peak value of packet transmission at a time point. This may suffer from a network card bottleneck of the source end device and cause packet loss, leading to a time delay of data synchronization instead. According to an embodiment shown in FIG. 4, in the incremental synchronization process, after determining that the latest source-end write operation sequence number is greater than the latest destination-end write operation sequence number, the source end further determines whether the frequency at which the source end sends data reaches a predetermined upper limit, and if not, the source end pushes to the destination end in real-time the write operation information corresponding to the source-end write operation sequence number(s) greater than the latest destination-end write operation sequence number; otherwise, the source end stops pushing the write operation information until the frequency at which the source end sends data falls below the predetermined upper limit.

The frequency at which the source end sends data refers to frequency at which the source end sends data to all destination ends. The predetermined upper limit may be set according to properties of the source end device, on condition that the processing capability of the device is not exceeded and the phenomenon of network packet loss does not occur.

In addition, in the incremental synchronization process, when the source end determines that the latest source-end write operation sequence number is equal to the latest destination-end write operation sequence number, no data needs to be updated. In this case, the source end does not send a data synchronization packet to the destination end, and the destination end also does not return a response packet. Under this condition, there is no communication between the source end and the destination end, and if a value of the latest destination-end write operation sequence number stored by the source end is wrong, the value cannot be corrected an more. In order to avoid this problem, in another embodiment of the present invention, a mechanism of a sequence number request is introduced. The sequence number request is sent in a form of a hello packet, and when there is no data packet needing to be updated, the source end communicates with the destination end by using the hello packet for a latest destination-end write operation sequence number, so as to ensure accuracy of the destination-end write operation sequence number stored at the source end.

Figure 5:
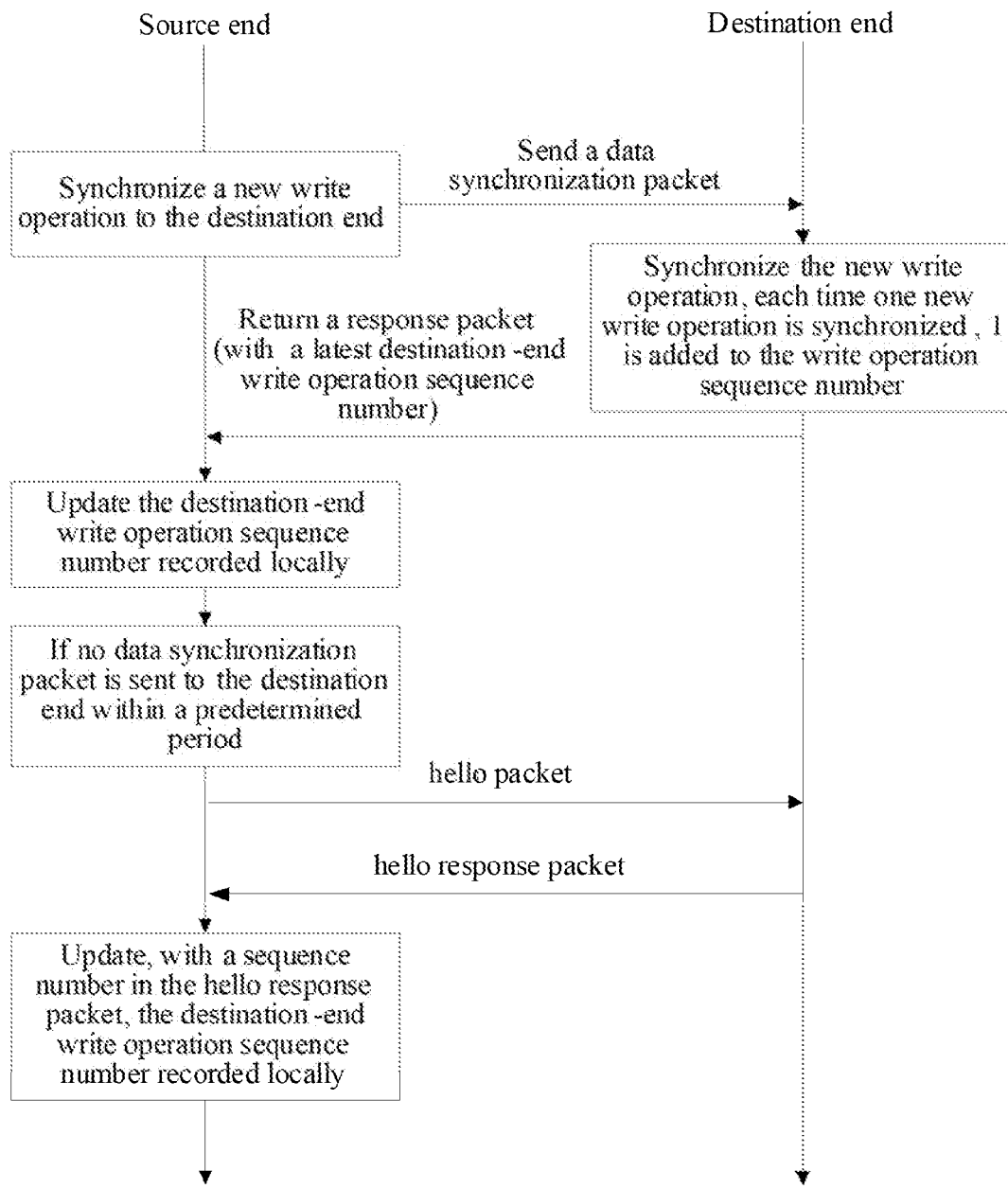
FIG. 5 is a schematic flowchart of updating a latest destination-end write operation sequence number by using a data synchronization packet and a hello packet according to an embodiment of the present disclosure.

FIG. 5 is a schematic flowchart for updating the latest destination-end write operation sequence number by using a data synchronization packet and a hello packet according to an embodiment of the present disclosure. According to the incremental synchronization process shown in FIG. 5, the source end may send the data synchronization packet to the destination end and update the latest destination-end write operation sequence number according to the response packet returned by the destination end. Then the source end sends a hello packet to the destination end (i.e., sending a sequence number request), if no data synchronization packet is sent to the same destination end (that is no write operation information is pushed to the same destination end) within a predetermined period after pushing in real-time the write operation information corresponding to the source-end write operation sequence number(s) greater than the latest destination-end write operation sequence number to the destination end. After receiving the hello packet (that is, the sequence number request) from the source end, the destination end returns a hello response packet (that is, a sequence number response), that includes the latest write operation sequence number of the destination-end primary memory area to the source end. After receiving the hello response packet (that is, the sequence number response) from the destination end, the source end updates, with the sequence number in the response, the destination-end write operation sequence number stored therein. The source end communicates with the destination end by using the hello packet for the latest destination-end write, operation sequence number, so as to ensure accuracy of the destination-end write operation sequence number stored at the source end.

In the foregoing incremental synchronization process, the destination end is updated in time when there is no abnormal synchronization data. However, if abnormity of synchronization data occurs, real-time performance of data synchronization is affected. Therefore, in another embodiment of the present invention, abnormal synchronization data is processed when updating the destination end. Skipped single resending is performed on the abnormal data, to ensure sequent in-time updating of synchronization data, as shown in FIG. 6.

Figure 6:
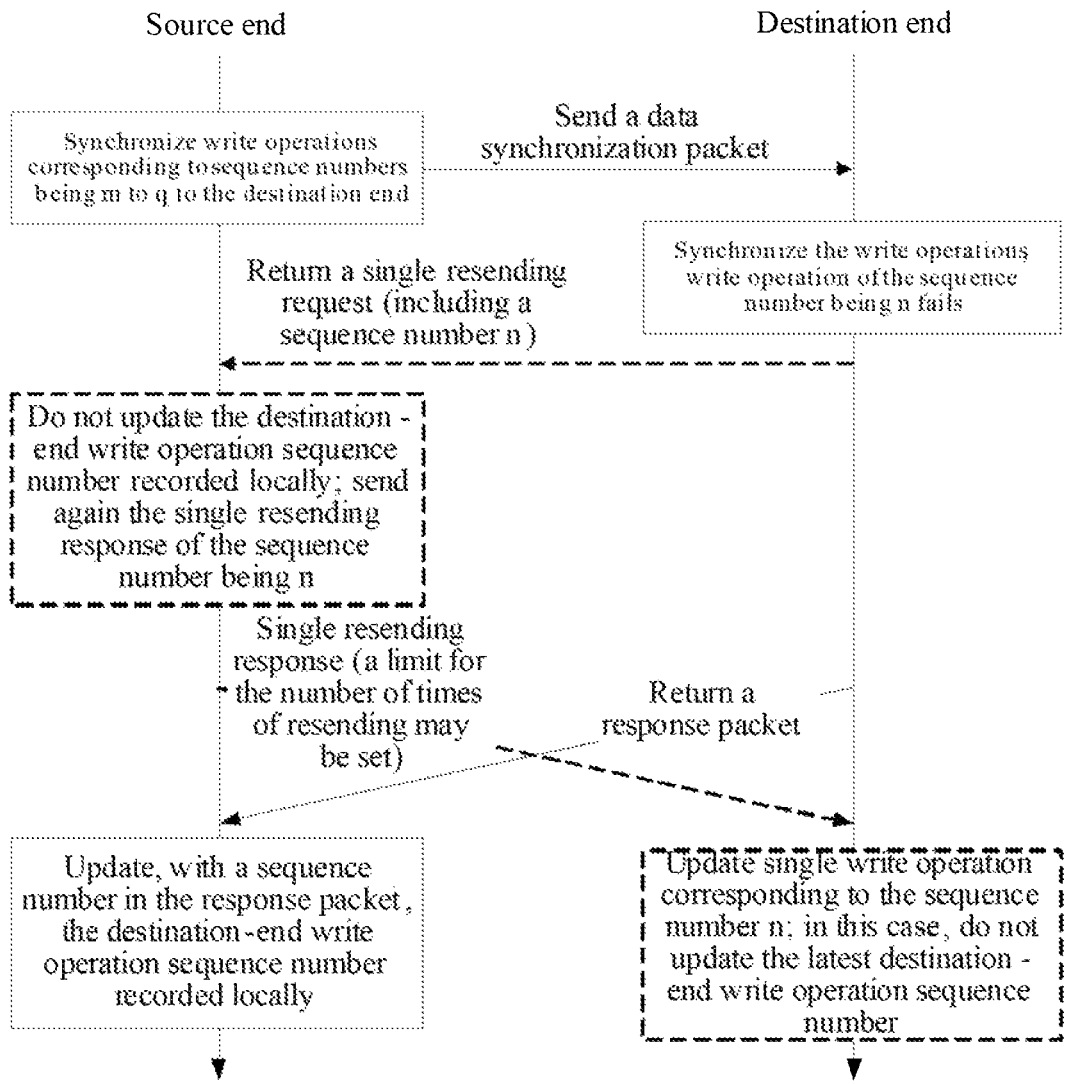
FIG. 6 is a flowchart of processing synchronization data abnormality at the destination end according to an embodiment of the present disclosure.

FIG. 6 is a flowchart for processing abnormal synchronization data at the destination end according to an embodiment of the present disclosure. Referring to FIG. 6, if a data synchronization packet pushed by the source end to the destination end includes write operation information corresponding to sequence numbers m to q, when the destination end performs write operations on the primary memory area according to the write operation information, if a write operation corresponding to a sequence number being a fails, and m<=n<=q, the destination end returns a single resending request including the sequence number n to a source-end synchronization module, and continues to perform write operations corresponding to sequence number(s) following the sequence number n on the primary memory area until a write operation corresponding to is sequence number being q is synchronized. Then the write operation sequence number of the destination-end primary memory area is updated as q, and a response packet including the latest sequence number q is returned to the source end. After receiving the response packet including the latest sequence number q, the source end updates, with the sequence number q, the destination-end write operation sequence number stored in the source end. If the source end receives the single resending request from the destination end, the source end sends a single resending response including write operation information corresponding to the sequence number n to the destination end that initiates the request. After receiving the single resending response from the source end, the destination end performs a write operation corresponding to the sequence number being n on the primary memory area again according to the write operation information corresponding to the sequence number n in the response, i.e., updating single write operation corresponding to the sequence number being n. Further, the single resending request including the sequence number n is sent again if the write operation fails again. And the source end may record the number of times of sending the single resending response including the write operation information corresponding to the sequence number n to the same destination end, and stop sending the single resending response including the write operation information corresponding to the sequence number n to the destination end if the number of times reaches a predetermined upper limit (for example, the number of times for responding to the same sequence number for the same destination end in a day may be set to be 3).

Through the processing shown in FIG. 6, it can be avoided that when a piece of data is abnormal, synchronization of the destination end is hung up on updating of the corresponding write operation, causing that subsequent write operations available for updating cannot be updated. Thereby the fault tolerance capability of the destination end is improved. Besides, expandable upgrading performance of the destination end is also increased. When the source end is required to support a new data type, it is avoided that the destination end cannot synchronize the updating operation of other data types because the new data type cannot be identified, thereby enabling the destination end to have certain expandable upgrading performance.

According to some embodiments of the present disclosure, there may be two or more destination ends, the method for synchronizing data in real-time according to the above embodiments of the present invention may be performed between the source end and each destination end.

The present disclosure further discloses a data synchronization system for executing the foregoing data synchronization method.

Figure 7:
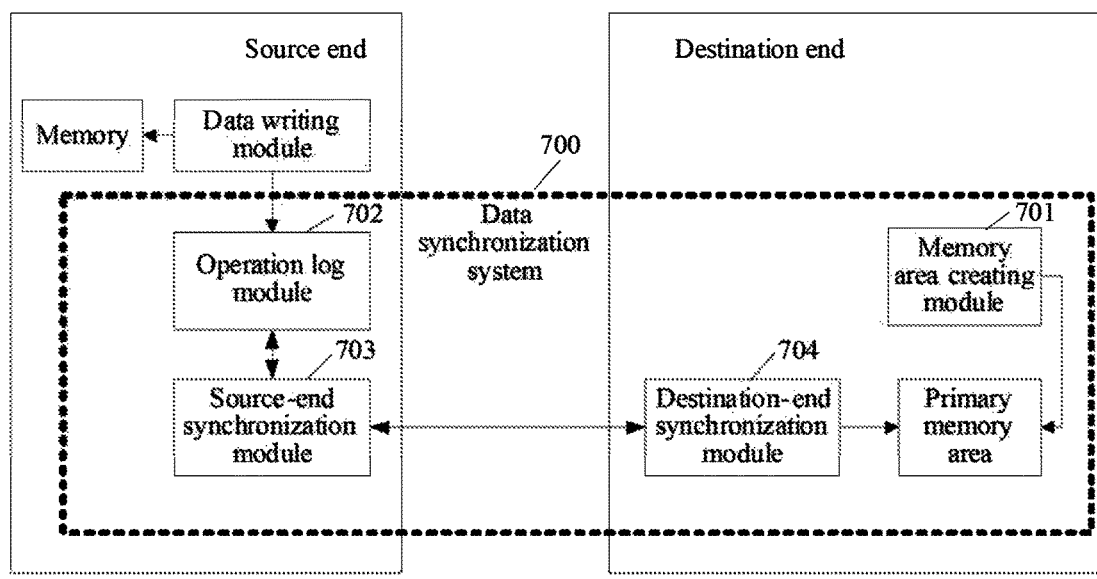
FIG. 7 is a schematic diagram of a data synchronization system according to an embodiment of the present disclosure.
Figure 8:
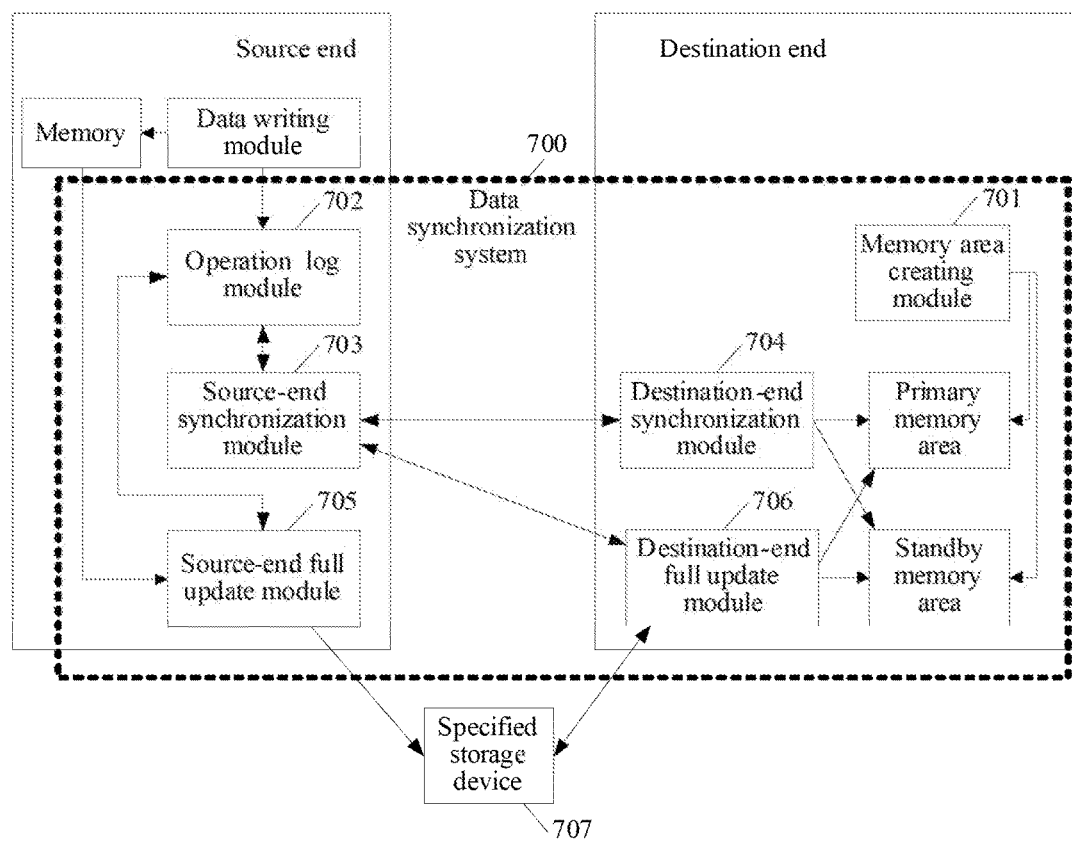
FIG. 8 is a schematic diagram of a data synchronization system according to another embodiment of the present disclosure.

FIG. 7 is a schematic diagram of the data synchronization system according to an embodiment of the present disclosure. FIG. 8 is a schematic diagram of the data synchronization system according to another embodiment of the present disclosure. Referring to FIG. 7 and FIG. 8, the data synchronization system 700 is shown in the dotted box in FIG. 7 and FIG. 8. The part in the dotted box at the source end is a source end apparatus for data synchronization, and the part in the dotted box at the destination end is a destination end apparatus for data synchronization.

In order to clearly describe constituent components and relationships of the source end apparatus and the destination end apparatus, the components of the source end apparatus and the destination end apparatus are described in together.

As shown in FIG. 7, the source end apparatus for data synchronization includes an operation log module 702 and a source-end synchronization module 703. The operation log module 702 is configured to record a log for a write operation of the source end, the log including operation information and a sequence number for the write operation. The source-end synchronization module 703 is configured to record a latest destination-end write operation sequence number, and push in real-time write operation information corresponding to a source-end write operation sequence number greater than the latest destination-end write operation sequence number to the destination end if it is determined that a latest source-end write operation sequence number is greater than the latest destination-end write operation sequence number.

The destination end apparatus for data synchronization includes a memory area creating module 701 and a destination-end synchronization module 704.

The memory area creating module 701 is configured to create a primary memory area at the destination end. The destination-end synchronization module 704 is configured to receive write operation information pushed by source-end synchronization module, perform a write operation on the primary memory area according to the write operation information so as to update data in the primary memory area, record a write operation sequence number of the destination-end primary memory area, and send a latest write operation sequence number of the destination-end primary memory area to the source-end synchronization module.

The real-time performance of data synchronization between the source end and the destination end of the data synchronization system is improved, in addition, because network packet loss or data abnormity often happen in network transmission, when the data synchronization system shown in FIG. 7 performs real-time data synchronization, there may be difference between the source end data and the destination-end data. And accuracy of data synchronization may be poor. Therefore, according to another embodiment, a standby memory area may further be created at the destination end, and a full update module is further added, so as to improve accuracy of data synchronization.

According to an embodiment of the disclosure, the source-end synchronization module of the source end apparatus is configured to: determine periodically whether a latest source-end write operation sequence number is greater than the latest destination-end write operation sequence number, and if the latest source-end write operation sequence number is greater than the latest destination-end write operation sequence number, package the write operation information corresponding to the source-end write operation sequence number greater than the latest destination-end write operation sequence number into a data packet, and push in real-time the data packet to the destination end.

According to another embodiment of the disclosure, the source-end synchronization module is further configured to: send a single resending response including write operation information corresponding to a sequence number n to a destination-end synchronization module after receiving the single resending request from the destination end.

According to another embodiment of the disclosure, the source-end synchronization module is further configured to: record the number of times of sending the single resending response including write operation information corresponding to the sequence number n to the destination end, and stop sending the single resending response including the write operation information corresponding to the sequence number n to the destination end if the number of times reaches a predetermined threshold.

According to another specific embodiment of the disclosure, the source-end synchronization module is further configured to: if it is determined that the latest source-end write operation sequence number is greater than the latest destination-end write operation sequence number, determine whether frequency at which the source end sends data reaches a predetermined threshold, push in real-time the write operation information corresponding to the source-end write operation sequence number greater than the latest destination-end write operation sequence number to the destination end if the frequency does not reach the threshold, and stop pushing the write operation information if the frequency reaches the threshold.

According to another embodiment of the disclosure, the source-end synchronization module is further configured to: send a sequence number request to the destination end if no write operation information is pushed to the destination end within a predetermined period after pushing in real-time the write operation information corresponding to the source-end write operation sequence number greater than the latest destination-end write operation sequence number to the destination end and update the destination-end write operation sequence number recorded by the source end with a sequence number in a sequence number response, after receiving the sequence number response from the destination end.

According to another embodiment of the disclosure, the source end apparatus further includes a source-end full update module. The source-end full update module is configured to import periodically full data of the source-end memory and a source-end write operation sequence number at the importing moment into a specified storage device.

According to a further embodiment of the disclosure, the source-end synchronization module is further configured to: send write operation information corresponding to a source-end write operation sequence number greater than the source-end write operation sequence number at the importing moment as a response to the destination-end full update module, after receiving the active incremental synchronization request from the destination-end full update module.

According to an embodiment of the disclosure, the destination-end synchronization module is further configured to: when performing write operations on the primary memory area according to the write operation information, if one of the write operations corresponding to a sequence number n fails, send a single resending request including the sequence number n to the source-end synchronization module, and perform a write operation corresponding to a sequence number following the sequence number a on the primary memory area; and perform a corresponding write operation on the primary memory area again according to the write operation information corresponding to the sequence number n in the single resending response, after receiving the single resending response from the source end synchronization module.

According to another embodiment of the disclosure, the destination-end synchronization module is further configured to: perform a corresponding write operation on the primary memory area again according to the write operation information corresponding to the sequence number n in the single resending response after receiving the single resending response from the source end, and send again the single resending request including the sequence number n if the corresponding write operation fails again.

According to another embodiment of the disclosure, the destination-end synchronization module is further configured to: send a sequence number response including a latest write operation sequence number of the destination-end primary memory area to the source end synchronization module, after receiving a sequence number request from the source-end synchronization module.

According to another embodiment of the disclosure, the memory area creating module is further configured to create a standby memory area; and the destination end apparatus further includes: a destination-end full update module, configured to pull periodically full data and a source-end write operation sequence number at the importing moment from a specified storage device, and store the full data and the source-end write operation sequence number at the importing moment into the standby memory area, and after pulling and storing, change the standby memory area as a primary memory area to perform an incremental synchronization process, and change the previous primary memory area as a standby memory area.

According to a further embodiment of the disclosure, the destination-end full update module is further configured to: after pulling and storing the full data and the source-end write operation sequence number at the importing moment, send an active incremental synchronization request to the source-end synchronization module, wherein the request includes the source-end write operation sequence number at the importing moment; and after receiving a response from the source-end synchronization module, perform a corresponding write operation on the standby memory area according to write operation information in the response, record a write operation sequence number of the destination-end standby memory area, and if a latest write operation sequence number of the standby memory area is greater than or equal to the latest write operation sequence number of the primary memory area, change the standby memory area as a primary memory area to perform the incremental synchronization process and change the previous primary memory area as a standby memory area.

According to a further embodiment of the disclosure, the destination-end synchronization module employs a parent process and the destination-end full update module employs a child process.

The data synchronization system according to some embodiments of the present disclosure may include any of the source end apparatus described above, and any of the destination end apparatus described above.

Some other embodiments of the data synchronization system are described below.

FIG. 8 illustrates another embodiment of the data synchronization system. The differences between it and the data synchronization system described in FIG. 7 are described below.

The memory area creating module 701 is further configured to create a standby memory area.

Besides, the source end apparatus further includes a source-end full update module 705, and the destination end apparatus further includes a destination-end full update module 706.

The source-end full update module 705 is configured to import periodically full data of the source-end memory and a source-end write operation sequence number at the importing moment into a specified storage device 707.

The destination-end full update module 706 is configured to pull periodically full data and a source-end write operation sequence number at the importing moment from the specified storage device 707, and store the pulled full data and source-end write operation sequence number at the importing moment into the standby memory area, and after pulling and storing, change the standby memory area as a primary memory area to perform an incremental synchronization process, and change the previous primary memory area as a standby memory area.

According to an embodiment of the data synchronization system, the destination-end full update module 706 is further configured to: after pulling and storing the full data and the source-end write operation sequence number at the importing moment, send an active incremental synchronization request to the source-end synchronization module 703, wherein the request includes the source-end write operation sequence number at the importing moment; and after receiving a response from the source-end synchronization module 703, perform a corresponding write operation on the standby memory area according to write operation information in the response so as to update data in the standby memory, record a write operation sequence number of the destination-end standby memory area, and if a latest write operation sequence number of the standby memory area is greater than or equal to the latest write operation sequence number of the primary memory area, change the standby memory area as a primly memory area to perform the incremental synchronization process and change the previous primary memory area as a standby memory area. According to an embodiment, the source-end synchronization module 703 is further configured to: send write operation information corresponding to a source-end write operation sequence number greater than the source-end write operation sequence number at the importing moment as a response to the destination-end hall update module 706, after receiving the active incremental synchronization request from the destination-end full update module 706.

According to an embodiment of the data synchronization system, the source-end synchronization module 703 is configured to: determine periodically whether a latest source-end write operation sequence number is greater than the latest destination-end write operation sequence number, and if the latest source-end write operation sequence number is greater than the latest destination-end write operation sequence number, package the write operation information corresponding to the source-end write operation sequence number greater than the latest destination-end write operation sequence number into a data packet, and push in real-time the data packet to the destination end.

According to an embodiment of the data synchronization system, the destination-end synchronization module 704 is farther configured to: when performing write operations on the primary memory area according to the write operation information, if one of the write operations corresponding to a sequence number n fails, send a single resending request including the sequence number n to the source-end synchronization module, and perform a write operation corresponding to a sequence number following the sequence number n on the primary memory area; and perform a corresponding write operation on the primary memory area again according to the write operation information corresponding to the sequence number n in the single resending response, after receiving the single resending response from the source end synchronization module; and send again the single resending request if the write operation fails again. According to an embodiment, the source-end synchronization module 703 is further configured to: send a single resending response including write operation information corresponding to a sequence number n to a destination-end synchronization module after receiving the single resending request from the destination end.

According to an embodiment of the data synchronization system, the destination-end synchronization module 704 is further configured to: perform a corresponding write operation on the primary memory area again according to the write operation information corresponding to the sequence number n in the single resending response after receiving the single resending response from the source end synchronization module 703, and send again the single resending request including the sequence number n if the corresponding write operation fails again. According to an embodiment, the source-end synchronization module 703 is further configured to: record the number of times of sending the single resending response including write operation information corresponding to the sequence number a to the destination end, and stop sending the single resending response including the write operation information corresponding to the sequence number n to the destination end if the number of times reaches a predetermined threshold.

According to an embodiment of the data synchronization system, the source-end synchronization module 703 is further configured to: if it is determined that the latest source-end write operation sequence number is greater than the latest destination-end write operation sequence number, determine whether frequency at which the source end sends data reaches a predetermined threshold, push in real-time the write operation information corresponding to the source-end write operation sequence number greater than the latest destination-end write operation sequence number to the destination end if the frequency does not reach the threshold, and stop pushing the write operation information if the frequency reaches the threshold.

According to an embodiment of the data synchronization system, the source-end synchronization module 703 is further configured to: send a sequence number request to the destination end if no write operation information is pushed to the destination end within a predetermined period after pushing in real-time the write operation information corresponding to the source-end write operation sequence number greater than the latest destination-end write operation sequence number to the destination end, and update the destination-end write operation sequence number recorded by the source end with a sequence number in a sequence number response, after receiving the sequence number response from the destination end. According to an embodiment, the destination-end synchronization module 704 is further configured to: send a sequence number response including a latest write operation sequence number of the destination-end primary memory area to the source-end synchronization module, after receiving a sequence number request from the source-end synchronization module.

In addition, according to an embodiment of the data synchronization system, the destination-end synchronization module 704 employs a parent process and the destination-end full update module 706 employs a child process.

When there are two or more destination ends, the data synchronization system may be set in the source end and each of the destination ends, so that real-time and accurate data synchronization is achieved between the source end and these destination ends.

When the solutions of the present disclosure are applied to the scenario in which Agent is used to synchronize service basic data, real-time performance and accuracy of data acquired locally can be ensured. For the real-time performance and accuracy of data, the solution of the present disclosure is as good as the query method with a UDP packet sent to a primary site. For a query service of basic data needed for use by various types of services, the present disclosure has many advantages compared with the query method with a UDP packet: reducing costs introduced by deploying a great quantity of query servers, and reducing coupling of services to data query of packet sending, and properties of local query being much higher than that of query of UCP packet sending, which can better meet requirements of services of massive requests.

Furthermore, the present disclosure may be applied to data synchronization in, for example, a mircoblog system. Authority control data of the microblog, is deployed with Agent. Each service of the microblog needs to check authority data when receiving a service request, to determine whether the request is valid. Therefore, each service needs to query the authority control data. A quantity of requests are made for each service in the microblog. If authority query is provided by a query server, the authority query server would become a bottleneck for services of the microblog. The data synchronization method and system of the present disclosure which employ Agent to perform data query, can provide excellent query services for each service, and the authority control may be effective immediately.

It should be noted that, not all steps and modules in the flowchart or structural diagrams are necessary, and some steps or modules may be omitted as required. The execution order of the steps is not limited, and may be adjusted as required. Functional division of the modules is made merely for convenience of description. In actual implementation, one module may be divided into multiple modules, and functions of multiple modules may also be implemented by one module. These modules may be in a same device, or may also be in different devices.

Hardware modules in the embodiments may be implemented in a mechanic manner or an electronic manner. For example, a hardware module may include a specifically designed permanent circuit or a logic device (for example, a dedicated processor, such as an FPGA or an ASIC) that is used to complete a specific operation. The hardware module may also include a programmable logic device or circuit (for example, a general processor or another programmable processor) temporarily configured by software to perform as specific operation. And hence, the hardware module may be implemented in a mechanical manner, or using a dedicated permanent circuit or using a temporarily configured circuit (for example, configured by software) depending on cost and time consideration.

The present disclosure further provides a machine readable storage medium, which stores instructions that make a machine execute the method described herein. Specifically, a system or an apparatus with a storage medium may be provided. Software program code that may implement any one of the foregoing embodiments is stored in the storage medium, and the computing unit (such as CPU, or MPU) of the system or apparatus may read and execute the program code stored in the storage medium. In addition, instructions based on program code may be used to enable, for example, an operating system operated in a computer to implement some or all actual operations. The program code read from the storage medium may also be input into a memory disposed in an expansion board in a computer or be written into a memory disposed in an expansion unit connected to a computer, and then the instructions based on the program code may make, for example, a CPU, installed on the expansion board or expansion unit to execute some or all actual operations, so as to implement functions of any of the foregoing embodiments.

Examples of the storage medium used to provide the program code include a floppy disk, a hard disk, a magneto-optical disk, an optical disk (such as a CD-ROM, is CD-R, a CD-RW, a DVD-ROM, a DVD-RAM, a DVD-RW, or a DVD+RW), a tape, a non-volatile storage card, and a ROM. Optionally, the program code may be downloaded from a server computer at a cloud storage through as communications network.

In conclusion, the scope of the claims should not be limited to the implementation manner described in above examples, and the specification should be taken as a whole and be explained in a broadest manner.

What is claimed is:

1. A data synchronization method, comprising:
creating by a destination end apparatus, a primary memory area at the destination end apparatus; and
performing an incremental synchronization process wherein the incremental synchronization processing comprises:
recording, by a source end apparatus, a log for a write operation, the log comprising operation information and a sequence number for the write operation;
recording by the source end apparatus, a latest destination-end write operation sequence number;
pushing in real-time, by the source end apparatus, write operation information corresponding to a source-end write operation sequence number greater than the latest destination-end write operation sequence number to the destination end apparatus, if it is determined that a latest source end write operation sequence number is greater than the latest destination-end write operation sequence number;
performing, by the destination end apparatus, a write operation on the primary memory area according to the write operation information after receiving the write operation information;
recording, by the destination end apparatus, a write operation sequence number of the destination-end primary memory area,
sending, by the destination end apparatus, a latest write operation sequence number of the destination-end primary memory area to the source end apparatus; and
wherein if the source end apparatus determines that the latest source-end write operation sequence number is greater than the latest destination-end write operation sequence number, the incremental synchronization method comprises:
determining by the source end apparatus, whether frequency at which the source end apparatus sends data reaches a predetermined threshold;
pushing in real-time by the source end apparatus, the write operation information corresponding to the source-end write operation sequence number greater than the latest destination-end write operation sequence number to the destination end apparatus, if the frequency does not reach the threshold; and
stopping pushing by the source end apparatus, the write operation information, if the frequency reaches the threshold.

2. The method according to claim 1, wherein the source end apparatus determines periodically whether the latest source-end write operation sequence number is greater than the latest destination-end write operation sequence number, and if the latest source-end write operation sequence number is greater than the latest destination-end write operation sequence number, the source end apparatus packages the write operation information corresponding to the source-end write operation sequence number greater than the latest destination-end write operation sequence number into a data packet, and pushes in real-time the data packet to the destination end apparatus.

3. The method according to claim 2, wherein the incremental synchronization process further comprises:
when the destination end apparatus performs write operations on the primary memory area according to the write operation information, if one of the write operations corresponding to a sequence number n fails, sending, by the destination end apparatus, a single resending request comprising the sequence number n to the source-end apparatus for data synchronization, and performing, by the destination end apparatus, a write operation corresponding to a sequence number following the sequence number n on the primary memory area;
sending, by the source end apparatus, a single resending response comprising write operation information corresponding to the sequence number n to the destination end after receiving the single resending request from the destination end; and
performing, by the destination end apparatus, another corresponding write operation on the primary memory area according to the write operation information corresponding to the sequence number n in the single resending response, after receiving the single resending response from the source end apparatus.

4. The method according to claim 3, wherein after performing, by the destination end apparatus, the another corresponding write operation on the primary memory area according to the write operation information corresponding to the sequence number n in the single resending response after receiving the single resending response from the source end, the incremental synchronization process further comprises:
sending by the destination end apparatus, another single resending request comprising the sequence number n if the corresponding write operation fails again; and
recording, by the source end apparatus, a number of times of sending the single resending response comprising the write operation information corresponding to the sequence number n to the destination end apparatus, and
stopping sending by the source end apparatus, the single resending response comprising the write operation information corresponding to the sequence number n to the destination end apparatus if the number of times reaches a predetermined threshold.

5. The method according to claim 1, wherein the incremental synchronization process further comprises:

sending, by the source end apparatus, a sequence number request to the destination end apparatus, if no write operation information is pushed to the destination end apparatus within a predetermined period after pushing in real-time the write operation information corresponding to the source-end write operation sequence number greater than the latest destination-end write operation sequence number to the destination end apparatus;

sending, by the destination end apparatus, a sequence number response comprising the latest write operation sequence number of the destination-end primary memory area to the source end apparatus, after receiving the sequence number request from the source end apparatus; and updating, by the source end apparatus, the destination-end write operation sequence number recorded by the source end apparatus with the sequence number in the response, after receiving the sequence number response from the destination end apparatus.

6. The method according to claim 1, wherein the method further comprises:

creating by the destination end apparatus, a standby memory area at the destination end apparatus; and performing a full update process, comprising:

importing periodically, by the source end apparatus, full data of its memory and a source-end write operation sequence number at the importing moment into a specified storage device;

pulling periodically, by the destination end apparatus, the full data and the source-end write operation sequence number at the importing moment from the specified storage device, and storing, by the destination end apparatus, the full data and the source-end write operation sequence number at the importing moment into the standby memory area; and changing the standby memory area at the destination apparatus as the primary memory area to perform the incremental synchronization process, and changing the previous primary memory area at the destination apparatus as the standby memory area.

7. The method according to claim 6, wherein after pulling and storing, by the destination end apparatus, the full data and the source-end write operation sequence number at the importing moment, the method further comprises:

sending, by the destination end apparatus, an active incremental synchronization request to the source end apparatus, wherein the request comprises the source-end write operation sequence number at the importing moment;

sending, by the source end apparatus, write operation information corresponding to a source-end write operation sequence number greater than the source-end write operation sequence number at the importing moment as a response to the destination end apparatus, after receiving the active incremental synchronization request from the destination end apparatus; and after receiving the response from the source end apparatus, performing, by the destination end apparatus, a corresponding write operation on the standby memory area according to the write operation information in the response, recording a write operation sequence number of the destination-end standby memory area, and if a latest write operation sequence number of the standby memory area is greater than or equal to the latest write operation sequence number of the primary memory area, changing the standby memory area as a primary memory area to perform the incremental synchronization process and changing the previous primary memory area as a standby memory area.

8. The method according to claim 6, wherein the incremental synchronization process is performed by the destination end apparatus with a parent process, and the full update process is performed by the destination end apparatus with a child process.

9. A source end apparatus for data synchronization, comprising:

at least a processor coupled to a memory which stores executable instruction codes, wherein the instruction codes when executed by the processor, configures the source end apparatus to:

record a log for a write operation of the source end apparatus, the log comprising operation information and a sequence number for the write operation, record a latest destination-end write operation sequence number, and push in real-time write operation information corresponding to a source-end write operation sequence number greater than the latest destination-end write operation sequence number to the destination end if it is determined that a latest source-end write operation sequence number is greater than the latest destination-end write operation sequence number; and wherein if the source end apparatus determines that the latest source-end write operation sequence number is greater than the latest destination-end write operation sequence number, the processor:

determines, whether frequency at which the source end apparatus sends data reaches a predetermined threshold;

pushes in real-time, the write operation information corresponding to the source-end write operation sequence number greater than the latest destination-end write operation sequence number to the destination end apparatus, if the frequency does not reach the threshold;

stops pushing, the write operation information, if the frequency reaches the threshold.

10. The source end apparatus according to claim 9, wherein the source end apparatus is further configured to: determine periodically whether a latest source-end write operation sequence number is greater than the latest destination-end write operation sequence number, and if the latest source-end write operation sequence number is greater than the latest destination-end write operation sequence number, package the write operation information corresponding to the source-end write operation sequence number greater than the latest destination-end write operation sequence number into a data packet, and push in real-time the data packet to the destination end.

11. The source end apparatus according to claim 9, wherein the source end apparatus is further configured to: send a single resending response comprising write operation information corresponding to a sequence number n to synchronize the destination end apparatus after receiving a single resending request from the destination end apparatus.

12. The source end apparatus according to claim 9, wherein the source end apparatus is further configured to: send a sequence number request to the destination end apparatus if no write operation information is pushed to the destination end apparatus within a predetermined period after pushing in real-time the write operation information corresponding to the source-end write operation sequence number greater than the latest destination-end write operation sequence number to the destination end, and update the destination-end write operation sequence number recorded by the source end apparatus with a sequence number in a sequence number response, after receiving the sequence number response from the destination end apparatus.

13. The source end apparatus according to claim 9, wherein the source end apparatus is further configured to:
   import periodically full data of a source-end memory and a source-end write operation sequence number at the importing moment into a specified storage device.

* * * * *